United States Patent [19]

Kaufman

[11] Patent Number: 4,487,729

[45] Date of Patent: Dec. 11, 1984

[54] FRICTION LINING MATERIAL

[75] Inventor: Edward R. Kaufman, Andover, Mass.

[73] Assignee: P. T. Brake Lining Company, Lawrence, Mass.

[21] Appl. No.: 475,498

[22] Filed: Mar. 15, 1983

Related U.S. Application Data

[60] Division of Ser. No. 430,775, Sep. 30, 1982, Pat. No. 4,461,643, which is a continuation-in-part of Ser. No. 402,831, Jul. 29, 1982, abandoned, and Ser. No. 259,857, May 4, 1981, abandoned, and Ser. No. 98,996, Nov. 30, 1979, abandoned.

[51] Int. Cl.$^3$ .............................. B29H 5/26; B29J 5/00
[52] U.S. Cl. ...................................... 264/26; 264/109; 264/120; 521/54; 523/218; 523/155; 524/407; 524/450
[58] Field of Search ............ 264/26, 109, 120; 521/54; 523/218, 155; 524/407, 450

[56] References Cited

U.S. PATENT DOCUMENTS

| | | | |
|---|---|---|---|
| 2,012,259 | 8/1935 | Denman | 260/3 |
| 2,874,034 | 2/1959 | Rieke | 51/298 |
| 3,267,048 | 8/1966 | Horste et al. | 521/181 |
| 3,307,969 | 3/1967 | Quinn | 106/122 |
| 3,948,830 | 4/1976 | Donnelly et al. | 260/37 EP |
| 4,388,423 | 6/1983 | Kaufman et al. | 521/54 |
| 4,461,643 | 7/1984 | Kaufman et al. | 521/54 |

FOREIGN PATENT DOCUMENTS 45-30242  10/1970  Japan .

*Primary Examiner*—Morton Foelak
*Attorney, Agent, or Firm*—Wolf, Greenfield & Sacks

[57] ABSTRACT

A friction material for use as a brake lining in automobiles, trucks, buses or similar vehicles. The brake lining contains no more than traces of asbestos and utilizes the mineral vermiculite as a basic constituent. The formulation of the brake lining comprises a non-fibrous natural or synthetic mineral or mineral-like material which on being compressed at ambient temperatures and at pressures of 1700 to 2600 p.s.i. has significant green strength in the order of 2 to 25 p.s.i. and also has appropriate thermal resistance, frictional properties, and shear and flexural strengths, together with a thermosetting resin as the basic components together with other organic and inorganic materials as friction modifiers and fillers. The mineral preferably comprises vermiculite, and together with the resin comprises preferably about 35% to 100% by weight of the brake lining formulation. The ratio by weight of resin to vermiculite is preferably in a range having a upper limit not exceeding about 1.2/1 to 1.5/1 and a lower limit not less than about 0.15/1.

10 Claims, No Drawings

FRICTION LINING MATERIAL

This application is a division of application Ser. No. 430,775, filed Sept. 30, 1982 now U.S. Pat. No. 4,461,643 which is a continuation-in-part of application Ser. No. 402,831 filed July 29, 1982, now abandoned application Ser. No. 259,857 filed May 4, 1981, now abandoned and application Ser. No. 98,996 filed Nov. 30, 1979, now abandoned.

SUBJECT MATTER OF THE INVENTION

The present invention relates to an improved brake lining utilizing a mineral such as vermiculite as a basic component, and further relates to the use of such material in the manufacture of composite friction materials in which the manufacturing process involves the production of a preform.

DESCRIPTION OF THE PRIOR ART

The prior art discloses brake lining for use in automotive, truck, bus, or similar vehicles as well as off-the-road equipment such as farm machinery and construction equipment. Varying compositions for the brake lining are disclosed in the prior art, but predominantly the prior art brake lining consists of two basic systems. In one system, organic or inorganic fibers are dispersed in a resin composition. The fibers are ordinarily asbestos, metal, other minerals or glass and are used for strength, thermal and frictional properties. The other system comprises a sintered metal in combination with metal oxides. In this latter system there are no organic binders. Of these systems, the first, which uses asbestos as the fiber, is the most popular because asbestos is relatively inexpensive, is easily performed and provides a brake lining having excellent wear, durability, friction and strength properties. However, asbestos has been found to expose workers making or installing the brake linings as well as the public to a potentially serious health hazard. It has been determined in recent years that the inhalation of small asbestos fibers can result in a disease known as asbestosis in which these fibers accumulate on the lungs, scar lung tissue, and may cause many respiratory problems. It has become increasing clear that inhalation of asbestos fibers over an extended period of time can lead to a cancer of the lining of the lungs known as mesothelioma as well as lung cancer. In view of these recent findings under investigations conducted by the federal government as well as private concerns, it has become urgent to find substitutes for asbestos in those applications involving the manufacture and use of materials containing asbestos.

In the operation of conventional asbestos-based brake lining, as the brake lining wears away some of the asbestos discharges into the atmosphere in its fibrous form posing a potential hazard. In view of the potential hazard of asbestos materials, it has become increasingly desirable for manufacturers of friction materials such as asbestos-based brake lining to find suitable substitutes for asbestos. While mineral and metal fiber material have been substituted for the fibrous asbestos material, brake linings employing such materials to date have had inferior physical strength and brittleness. These materials are also very heavy and costly to manufacture and as a result such substitute formulations have had only limited applicability. Other materials have been tried in brake linings and related products but are unacceptable because of difficulties in performing and because of prohibitive costs of materials and processing. Therefore, the search for substitutes for asbestos in recent years has concentrated on fibrous materials such as glass fibers, steel wool fibers, iron filings, mineral wool fibers, and comparable fibrous materials. An example of these alternatives is illustrated in U.S. Pat. No. 2,012,259. This patent teaches the substitution of talc called asbestine. This material is, however, a short fiber material and therefore may have some of the same health hazards associated with asbestos. Some effort has been made to incorporate a non-fiber material such as perlite (see U.S. Pat. No. 3,307,969) in a friction material. However, such compositions in U.S. Pat. No. 3,307,969 contain asbestos as a major constituent, and the resultant product is not capable of being preformed, since perlite has no green strength when compressed. While some of these substitutes provide the strength and others provide the frictional properties and still others provide wear resistance, none of these has as yet been found to provide all of these properties coupled with economical material and manufacturing costs. In addition, many of these fibers may themselves pose potential health hazards. Therefore, a brake lining formulation which contains no asbestos, yet produces a brake lining material comparable to conventional asbestos-based brake lining in wear, durability, friction and strength, would be an important improvement over the prior art.

SUMMARY OF THE INVENTION

It is an object of the present invention to provide an asbestos-free brake lining which has wear, durability, friction and strength characteristics comparable to or exceeding those of conventional asbestos type brake linings.

It is also an object of the present invention to provide a non-asbestos composition of material which can be shaped into brake pads, discs, and the like using a conventional process of first compressing the composition at ambient temperatures into a preform and subsequently subjecting the preform to compression at elevated temperatures.

It has been determined that a brake lining comprised of vermiculite and a thermosetting resin having heat resistant properties, preferably phenol formaldehyde, produces a satisfactory asbestos-free brake lining. Alternative thermosetting resins may include phenol furfural, melamine formaldehyde, epoxy resins, cross-linked alkyd resins, diallyl phthalate resins, urea-formaldehyde, heat bodied linseed oil and cashew nut liquid resins. It has been found that a satisfactory brake lining is produced if the weight ratio of resin to vermiculite is in a range having a upper limit not exceeding about 1.2/1 to 1.5/1 and a lower limit not less than about 1.15/1. A suitable range is between about 1.2/1 and 0.15/1, preferably 1.2/1 to 0.4/1. The total weight percent of resin plus vermiculite in the brake lining is preferably between about 35% and 100%. The remainder of the mixture is comprised of filler components.

A satisfactory mixture of filler components for automobile disc pads brake lining or truck blocks or segments to be used in conjunction with the vermiculite-resin combination has been found to consist of cashew-based friction particles, brass chips, soft bituminous coal, chromite ore, calcium carbonate and graphite, or their equivalents.

In the case of roll-brake lining which is used for passenger car drum brakes, a heat bodied linseed oil is preferred; however, the above-cited group of thermosetting resins preferably in liquid form is also suitable. A satisfactory mixture of filler components for roll-brake lining has been found to consist of bituminous coal, calcium carbonate, barium sulphate, brass chips, talc, sulphur and hydrated lime.

The method of manufacture of the brake lining in the form either of disc pads for typical application in passenger cars or block or segment lining for typical application in trucks usually consists of a preforming step followed by a molding step. Generally, the preforming step is carried out by subjecting the mixture of dry constituents to pressures of between 300 and 5500 p.s.i.g. at room temperature for a period of at least two seconds, and preferably between two seconds and two minutes, depending on the size and thickness of the part. The resulting preform is then subjected to a molding step wherein the preform is compressed at pressures of approximately 1500 to 2500 p.s.i.g. at a temperature of about 280° F. to 360° F. for 4 to 14 minutes depending upon the size and thickness of the part.

DESCRIPTION OF THE PREFERRED EMBODIMENT

A preferred brake lining of the invention is composed of vermiculite, preferably expanded vermiculite, resin, and filler components. The vermiculite and resin in the preferred embodiment may have a total composition in the mixture in the range between 35% and 100% by weight. The filler components (i.e. components other than resins and vermiculite) may comprise 0% to 65% by weight of the brake lining composition. It has been determined by experiment that a brake lining having a combined weight of vermiculite and resin in the range between 35 and 100 weight percent and having a weight ratio of resin to vermiculite in a range between 1.2/1 and 0.4/1 produces a particularly strong and durable brake lining which is easily preformed and molded.

The relative percentages of vermiculite and resin determine the wear and processability characteristics.

When the relative amount of vermiculite is high the wear is high; conversely, when the amount of resin is comparatively high the composition becomes difficult to process and the resulting product has a tendency to fade. Since there appears to be no abrupt change in the properties with change in composition, the recited range is intended to define a spectrum of commercially preferred materials.

The resinous material used in the brake lining of the present invention may be generally any thermosetting resin having heat-resistant properties sufficient to withstand temperatures up to 1000° F. It has been determined that phenol formaldehyde, phenol furfural, melamine formaldehyde, epoxy resins, cross-linked alkyd resins, diallyl phthalate resins, and urea-formaldehyde thermosetting resins form particularly suitable binders with vermiculite. Additionally, cashew nut liquid resins, drying oils such as china wood oil and heat bodied linseed oil, latices, and elastomeric resins are suitable. A phenol formaldehyde resin suitable for use in the present formulation is available from Schenectedy Chemicals Co., Inc., of Schenectedy, N.Y. and is manufactured under the catalog code SP6416.

Vermiculite is a hydrated magnesium-aluminum-iron silicate having in its natural form a platelet-type crystalline structure and in its expanded form an accordian-like structure with a typical diameter of about 1 mm and a typical length of about 3 mm.

An expanded grade of vermiculite mineral crushed to particle size no larger than 3.35 mm and no smaller than 0.15 mm is preferred for use in the present invention. A vermiculite of the designation Montana expanded grade vermiculite is particularly suitable. A typical weight analysis of Montana vermiculite ore is given as follows: $SiO_2$ 38.64%, $MgO$ 22.63%, $Al_2O_3$ 14/94%. $Fe_2O_3$ 9.29%, $K_2O$ 7.84%, $CaO$ 1.23%, $Cr_2O_3$ 0.29%, $Mn_3O_4$ 0.11%, $Cl$ 0.28%. A vermiculite mineral of this type is readily obtained from W. R. Grace & Co. under the trade name designation "Industrial Vermiculite".

A microscopic examination of industrial vermiculite indicates that it has a three-dimensional accordian structure with typical particle maximum diameter of 1 mm and length of 3 mm.

It has been determined that asbestos, which is commonly employed in conventional brake linings typically comprising about 40 wt% to 60 wt%, can be eliminated when the above-stated brake lining composition of the invention containing vermiculite is used. The only asbestos present in the formulation of the invention is a trace amount of less than 0.5 wt% in the vermiculite itself.

At this level the trace asbestos provides no reinforcing or other properties to the brake lining. The vermiculite when used as an asbestos substitute in addition to providing much of the friction and wear properties of asbestos additionally functions in part as a reinforcing agent, thermal stabilizer and filler. The reinforcing property of the vermiculite is unexpected in view of its nonfibrous character. The present formulation employing vermiculite has the significant advantage that a noncarcinogenic material has been substituted for the asbestos, a known carcinogen, without sacrifice in the wear or strength properties of the brake lining.

The filler components comprising the brake lining formulation of the invention may range from 0 to 65% by weight of the total mixture.

Although substitutes for these filler components are possible, a particularly suitable formulation for disc brake lining or block or segment lining is one component group wherein the filler components (i.e., components other than resin or vermiculite) consist of the components designated in Table 1 in the approximate portions indicated as wt. percent of the total filler component group.

TABLE 1

| Typical Filler Components, Wt % of Filler Component Group | |
|---|---|
| Friction Particles | 17. |
| Brass Chips | 3. |
| Sea Coal | 9. |
| Chromite | 4. |
| Marblewhite | 27. |
| Graphite | 40. |
| | 100. |

The friction particles are preferably a cashew-based material such as cashew shell oil-based friction particles. Suitable cashew-based friction particles are available from Colloid Chemicals, Inc., having its main office in Cedar Knolls, N.J. and are sold under grade No. 6250-30. It is theorized that these particles serve to control the friction and wear of the brake lining.

The brass chips may be any clean brass chips. Typically, these chips may have an average particle size of about 0.4 mm in thickness and 3 mm in length. Other brass chips either larger or smaller may also be used.

The brass chips provide additional abrasive properties, it is theorized, and also serve to clean the brake rotor or drum. Alternatively, instead of brass, chips such as zinc of about the same size may be used.

The sea coal used is a preferred grade of ground bituminous (soft) coal and may be obtained from Whitehead Brothers Co., having its main office in Florham Park, N.J. It is theorized that the sea coal provides the necessary friction in the 200°–400° F. temperature range. Alternatively, instead of sea coal other types of coal such as anthracite may be used.

The chromite is a chrome ore containing typically about 40 wt% $Cr_2O_3$ and 25 wt% $Fe_2O_3$, 15 wt% $Al_2O_3$, 14 wt% MgO and 6 wt% $SiO_2$. A chromite ore suitable as a filler may be obtained from Foote Mineral Company having a main office at Route 100, Exton, Pa. The chromite should be ground to an average particle size of about 325 mesh. Alternatively, many other minerals such as red iron oxide or fused aluminum oxide could be substituted for chromite.

The marblewhite has the composition calcium carbonate and may be purchased from Pfizer Co. having a principal place of business in Clifton, N.J. Alternatively, other filler materials instead of marblewhite such as barium sulfate (barytes) may be used.

The graphite used is preferably of grade 608A (industrial designation) and may be purchased in powdered form from Superior Graphite Co. having its main office in Chicago, Ill. The graphite is used in the brake lining as a lubricant and in connection with the vermiculite formulation of the invention to aid in ejecting the preformed disc pads from the molds. Alternatively, many other grades of graphite in flake or powder form may be used.

A typical composition for the disc, block or segment brake lining of the invention is set forth in Table 2.

TABLE 2

|  | WT % |
| --- | --- |
| Resin | 20.8 |
| Expanded Vermiculite | 45.2 |
| Friction Particles | 5.9 |
| Brass Chips | 1.1 |
| Sea Coal | 3.2 |
| Chromite | 1.3 |
| Marblewhite | 9.0 |
| Graphite | 13.5 |
|  | 100.0 |

It will be noted that in the composition set forth in Table 2 the resin plus expanded vermiculite comprise 66% of the mixture and the filler components comprise 34% of the mixture. With the individual filler component distribution as in Table 1 and the filler components at 34 wt% of the total mixture, brake linings of the invention were manufactured at various ratios of resin to vermiculite. Six brake lining compositions were prepared, each with a total filler content of 34 wt% of the mixture and distributed as in Table 2 and with resin-to-vermiculite weight ratios at 1.5, 1.2, 0.46, 0.4, 0.27 and 0.15, respectively. The six brake lining compositions were then subjected to moldability, friction, strength and wear tests as reported in Table 3. The test results for preforming and moldability characteristics were compared to results obtained with a conventional asbestos type brake lining having a composition 53 wt% asbestos, 15 wt% phenolic resin, 10 wt% cashew particles, 6 wt% rubber particles, 4 wt% zinc chips, 1 wt% carbon black, 7 wt% brass chips and 4 wt% calcium aluminate.

The ingredients were first blended in a Littleford Mixer. The mixed ingredients were then put into a preform mold cavity having roughly the desired product shape. The mixture was then compressed at room temperature and at a pressure of about 2600 p.s.i. for a period of about 15 seconds. The preformability characteristics of the brake lining composition resulting from the preforming step and the ease with which the preformed part could be ejected from the preforming mold cavity (ejectability) were compared with results obtained with a conventional type brake lining having the above-cited composition.

The preform was then removed from the preforming mold cavity and was subjected to a molding step. In the molding step the preform was placed into a second mold cavity of similar shape wherein it was compressed at pressures of approximately 1,900 p.s.i. at a temperature of about 320° F. for a period of about 4 minutes. The molded pads were then ground and drilled to their specifications. During the molding step three characteristics of the product were evaluated and recorded in Table 3 and compared with results obtained from the above-cited conventional asbestos-type brake lining. The three characteristics evaluated were: (a) the flowability of the material within the mold; (b) its tendency to blister and form air pockets; and (c) its tendency to stick in the mold. They show that for all ratios of resin to vermiculite between 1.5 and 0.15, the formulations are able to be preformed as well or better than the conventional asbestos formulation, but that its moldability as evidenced by flow, blisters and sticking is best at resin to vermiculite ratios of between 0.46 and 0.27.

The flexural and shear strengths as well as the friction and wear properties of the molded brake lining product of the invention were then measured and are also reported in Table 3.

A flexural strength of about 400 p.s.i. is currently considered well within the requirements of the automotive industry. Brake lining having a flexural strength as low as 200 p.s.i., or in some applications lower, are also considered satisfactory. All compositions except the one having a resin to vermiculite ratio of 0.15 had acceptable flexural strengths.

The shear strength of the molded brake lining product is a measure of the ability of the brake pad to withstand the braking forces which tend to shear the brake pad from the steel to which it is attached. The automotive industry currently requires a minimum shear strength of about 160 to 300 p.s.i. All ratios evaluated met this requirement.

The friction and wear tests as set forth by the Society of Automotive Engineers (SAE) Test Designation No. J661a have been applied to the brake lining of the invention and the results are reported in Table 3.

The hot friction coefficient is comparable to that coefficient of friction which results after the automobile rotor and brake lining have been heated due to prolonged or repeated stopping. A range of 0.350 to about 0.450 for both the hot and cold coefficient of friction have been found to be suitable for most automotive and truck applications, but higher or lower coefficients of friction may be desirable depending on the particular application. Hot and cold friction coefficients of 0.550 and higher have been found to be required in some cases. SAE Test J661a also determines brake lining wear by measuring the decrease in sample thickness which occurs during the test. A decrease of up to 0.010 inch is considered reasonable. All ratios of resin to vermiculite except 0.15 had acceptable wear. During the test, the lining will tend to swell or grow in thickness. An increase in thickness no greater than 0.002 is considered acceptable.

Upon inspection of the test data of the brake lining of the invention reported in Table 3 for varying resin-to-vermiculite weight ratios for mixtures containing about 34 wt% of total filler components, it may be observed that ratios of resin-to-vermiculite in a range having an upper limit not exceeding about 1.2/1 to 1.5/1 and a lower limit not less than about 0.15/1, thus having a weight ratio between about 1.2/1 to 0.15/1, preferably 1.2/1 to 0.4/1, produce a brake lining product complying with the aforementioned criteria and modern test standards.

TABLE 3

| | Filler Content: 34 wt % of Total Mixture | | | | | |
|---|---|---|---|---|---|---|
| Wt. Ratio of Resin to Vermiculite | 1.5 | 1.2 | 0.46 | 0.4 | 0.27 | 0.15 |
| 1. Preforming | | | | | | |
| a. Preformability | ** | ** | ** | ** | ** | ** |
| b. Ejectability | 0 | 0 | ** | * | ** | * |
| 2. Moldability | | | | | | |
| a. Flow | 0 | * | ** | ** | ** | ** |
| b. Blisters | 0 | * | ** | ** | * | * |
| c. Sticking | 0 | * | ** | ** | ** | 0 |
| 3. Flexural Str. (psi) | 400+ | 400+ | 400+ | 362 | 400+ | 103 |
| 4. Shear Strength (psi) | 490 | 490 | 490 | 450 | 510 | 314 |
| 5. SAE J661a | | | | | | |
| a. Cold Friction Coef. | X | 0.388 | 0.392 | 0.387 | 0.398 | 0.398 |
| b. Hot Friction Coef. | X | 0.383 | 0.386 | 0.375 | 0.367 | 0.405 |
| c. Wear (inches) | X | 0.004 | 0.0072 | 0.007 | 0.009 | 0.014 |
| d. Swell (inches) | X | 0.003 | 0.0015 | 0.001 | 0.000 | −0.001 |

Note 1:
0 is somewhat less than satisfactory or unsatisfactory
*is satisfactory but less satisfactory than the asbestos brake lining
**performance equal to or better than the asbestos based brake lining
X = could not run

TABLE 4

| Wt Ratio of Resin to Vermiculite | 1.5 | 0.46 | 0.15 | 1.5 | 0.46 | 0.15 |
|---|---|---|---|---|---|---|
| FILLER CONTENT | | | | | | |
| Wt % of total Mixture | 45% | 45% | 45% | 25% | 25% | 25% |
| 1. Preforming | | | | | | |
| a. Preformability | ** | ** | * | ** | ** | * |
| b. Ejectability | * | ** | ** | 0 | * | ** |
| 2. Moldability | | | | | | |
| a. Flow | 0 | ** | ** | 0 | ** | ** |
| b. Blisters | 0 | * | ** | 0 | * | * |
| c. Sticking | 0 | ** | ** | * | ** | ** |
| 3. Flexural Str. (psi) | 400+ | 400+ | 15 | 390 | 400+ | 400 |
| 4. Shear Str. (psi) | 560 | 560 | 185 | 608 | 716 | 412 |
| 5. SAE J661a | | | | | | |
| a. Cold Friction Coef. | 0.413 | 0.405 | 0.415 | 0.320 | 0.385 | 0.390 |
| b. Hot Friction Coef. | 0.454 | 0.392 | 0.407 | 0.314 | 0.393 | 0.405 |
| c. Wear (inches) | 0.004 | 0.006 | 0.0128 | 0.0026 | 0.0059 | 0.018 |
| d. Swell (inches) | 0.0035 | 0.002 | −0.001 | 0.004 | 0.0025 | −0.003 |

Note 1:
0 is somewhat less than satisfactory or unsatisfactory
*is satisfactory but less satisfactory than than the asbestos brake lining
** performance equal to or better than the asbestos brake lining

TABLE 5

| Resin/Vermiculite Ratio | 0.46 | 0.46 | 0.46 | 0.46 | 0.46 | 0.46 |
|---|---|---|---|---|---|---|
| Filler Content % by Wt. | 0 | 15 | 20 | 50 | 60 | 70 |
| 1. Preforming | | | | | | |
| a. Preformability | ** | ** | ** | ** | ** | * |
| b. Ejectability | 0 | * | * | * | * | * |
| 2. Moldability | | | | | | |
| a. Flow | ** | ** | ** | ** | ** | ** |
| b. Blisters | * | ** | ** | ** | ** | ** |
| c. Sticking | 0 | * | * | ** | ** | ** |
| 3. Flexural Str. (psi) | 400+ | 400+ | 400+ | 387 | 319 | 20 |
| 4. Shear Strength (psi) | 594 | 603 | 726 | 343 | 288 | 0 |
| 5. SAE J661a | | | | | | |
| a. Cold Friction Coef | .362 | .375 | .394 | .388 | .382 | .322 |
| b. Hot Friction Coef | .297 | .365 | .384 | .371 | .369 | .338 |
| c. Wear | .0147 | .0099 | .0088 | .0074 | .0067 | .0073 |

TABLE 5-continued

| Resin/Vermiculite Ratio | 0.46 | 0.46 | 0.46 | 0.46 | 0.46 | 0.46 |
|---|---|---|---|---|---|---|
| d. Swell | +.001 | .0025 | .002 | .001 | −.0005 | −.0015 |

Note 1:
0 is somewhat less than satisfactory or unsatisfactory
*is satisfactory but less satisfactory than the asbestos based brake lining
**performance equal to or better than the asbestos based brake lining The same tests reported in Table 3 were then repeated over the same range in ratios of resin-to-vermiculite (i.e., between 1.5/1 and 0.15/1) but with the total filler components varied in a range between about 25 and 45 wt% of the total mixture. (The distribution of filler components or their alternative substitutes in this series of tests was approximately as that given in Table 1). Approximately the same test results reported in Table 3 were obtained at corresponding resin-to-vermiculite weight ratios with the filler components varied in a range between about 25 and 45 wt% of the total mixture. A specific illustrative set of test results for the latter series of tests are reported in Table 4 for specific cases—namely, a mixture comprised of a resin-to-vermiculite weight ratio between 0.15/1 and 1.5/1 and filler components between about 25 wt% and 45 wt% of the total mixture.

Experiments were then conducted for total filler components ranging from 0 wt% to 70 wt% of the total mixture. The distribution of the filler components was approximately the same as given in Table 1. A specific illustrative set of test results over a range of filler components between 0 wt% and 70 wt% of the total mixture at a specific illustrative resin-to-vermiculite ratio of 0.46 is given in Table 5.

Based on all the tests it has been determined that a satisfactory product will result at a weight ratio of resin to vermiculite in a range having an upper limit not exceeding about 1.2/1 to 1.5/1 and a lower limit not less than about 0.15/1, with filler components in a range between 0 wt% and 65 wt% of the total mixture. With the filler components in a range between about 0 wt% and 65 wt% of the total mixture, a particularly satisfactory product results at a resin-to-vermiculite weight ratio in a range between 1.2/1 to 0.4/1 and more preferably at about 0.46/1.

Examples illustrative of the methods of manufacture of the brake lining of the invention for various applications are set forth as follows:

EXAMPLE 1

A method of manufacture and a disc pad brake lining for typical application in automobiles is given as follows:

Dry ingredients having the following composition were first thoroughly blended in a Littleford mixer:

|  | WT % |
|---|---|
| Expanded Vermiculite | 45.2 |
| Phenolic Resin | 20.8 |
| Friction Particles | 5.9 |
| Brass Chips | 1.1 |
| Sea Coal | 3.2 |
| Chromite | 1.3 |
| Marblewhite | 9.0 |
| Graphite | 13.5 |
|  | 100.0 |

About 150 gms of the mixture was then added to the preform mold having a shape approximately that of the desired product. The material was compressed under 2,600 p.s.i. at room temperature for about 15 seconds. The pressure was released and the compacted preform was then placed in a hot press mold. The preform was molded at about 350° F. for 4 minutes at a pressure of about 1,350 p.s.i. The cured pad was removed from the mold and post cured in an oven at 300° to 350° F. for 7 hours. The pad was machined to desired dimensions.

EXAMPLE 2

A method of manufacture and a block brake lining for application typically in heavy duty trucks is given as follows.

About 12 pounds of dry ingredients having the following composition were mixed in a Littleford mixing vessel:

|  | WT % |
|---|---|
| Expanded Vermiculite | 52.0 |
| Phenolic Resin | 14.0 |
| Friction Particles | 5.9 |
| Brass Chips | 1.1 |
| Sea Coal | 3.2 |
| Chromite | 1.3 |
| Marblewhite | 9.0 |
| Graphite | 13.5 |
|  | 100.0 |

The mixture was then compressed at about 350 p.s.i. pressure at room temperature for about 40 seconds to form the preform. The preform was then hot-pressed to the desired shape by molding in a hydraulic press at 300° to 360° F. for 14 minutes at a pressure of about 1,750 p.s.i. The cured slab was the removed from the mold and placed in a post-curing oven for 7 hours at 300° to 350° F. The slab was then cut, finish ground and drilled to desired specification.

EXAMPLE 3

A method of manufacture and a roll lining brake material for use in passenger cars is given as follows:

Approximately 20 pounds of ingredients having the following composition were blended in a Sigma mixer to form a wet mix batch:

|  | WT % |
|---|---|
| Expanded Vermiculite | 49.0 |
| Sea Coal | 14.7 |
| Marblewhite | 3.7 |
| Barytes | 6.1 |
| Talc | 3.7 |
| Sulfur | 1.5 |
| Hydrated Lime | 1.0 |
| Brass Chips | 0.1 |
| Heat Bodied Linseed Oil | 20.2 |
|  | 100.0 |

The wet mixture batch was then fed to a 2 roll molding machine, extruded at room temperature into a roll of compressed strip brake lining material approximately 2 inches wide by ¼ inch thick. The roll of brake lining material was then baked a 325° F. for 13 hours to produce a brake lining product material. The brake lining material was then cut into segments and finish ground.

EXAMPLE 4

11 pounds of the following ingredients in the following weight percentages were mixed in a Sigma mixer: Unexpanded Vermiculite Ore, 45.3 wt%; cashew-based friction particles grade No. 6250-30, 5.9 wt%; Brass Chips, 1.4 wt%; Sea Coal, 3.2 wt%; Chromite Ore, 0.7 wt%; Graphite, 13.6 wt%; Marblewhite 9.0 wt%; Phenol formaldehyde resin, 20.8 wt%. The mixture was processed at ambient temperatures and 1000 p.s.i. pressure to form a preform. The preform was then hot pressed at 300°-300° F. for four minutes at 1850 p.s.i. to form a friction material. The resultant friction material was postbaked for seven hours at 325° F. and ground and drilled to specification. The mixture was slightly more difficult to preform and to mold than the conventional asbestos-based disc pad and was more prone to chipping; however, a suitable friction material for use as a brake lining was made. The friction, wear, and strength properties were found to be substantially the same as that reported in Table 2 for the corresponding resin-to-vermiculite weight ratio; however, the flexural strength was found to be somewhat lower, approximately about 60 to 200 p.s.i.

What is claimed is:

1. A process for manufacturing a friction material substantially free of asbestos for use as a brake lining which comprises the steps of:
   blending expanded vermiculite having an average minimum particle size of about 0.15 mm, thermosetting resin and filler material to form a mixture said vermiculite and thermosetting resin being present in the friction material in a weight ratio of resin-to-vermiculite in a range from about 1.5/1 to 0.15/1,
   passing the mixture to a preform mold cavity having a shape approximately that of the desired product, and compressing the mixture into the preform mold cavity at about room temperature and pressure of between about 300 psig and 5500 psig for a period of at least 2 seconds to form a preform,
   passing the preform to a second mold cavity wherein it is compressed at pressures of between about 1500 to 2500 psig at a temperature of 280° F. to 360° F. for a period of between about 2 and 14 minutes to form a friction material.

2. A process as in claim 1 in which the preform is dielectrically heated to 150° to 190° F. before being passed to a second mold cavity wherein it is compressed at pressures of between about 1500 and 2500 psig at a temperature of 300° to 360° F. for a period between about 2 and 14 minutes to form a friction material.

3. A process as in claim 1 which includes the additional step of baking the friction material for about 7 to 10 hours at a temperature of about 300° to 350° F.

4. A process as in claim 1 wherein the vermiculite plus resin comprise between about 35 and 100 percent by weight of the mixture.

5. A process as in claim 1 wherein the thermosetting resin is selected from the group consisting of phenol formaldehyde, phenol furfural, melamine formaldehyde, epoxy resins, cross linked alkyd resins, diallyl phthalate resins, urea formaldehyde, heat bodied linseed oil and cashew nut liquid resins.

6. A process as in claim 1 wherein the filler material is comprised of about 18 wt% cashew based friction particles, 3 wt% brass chips, 9 wt% bituminous coal, 4 wt% chromite, 26 wt% calcium carbonate and 40 wt% graphite.

7. A process for manufacturing a roll brake lining substantially free of asbestos which comprises the steps of:
   blending expanded vermiculite having an average minimum particle size of about 0.15 mm, a filler material, and a thermosetting liquid resin to form a wet mix batch, said vermiculite and thermosetting resin being present in the brake lining in a weight ratio of resin-to-vermiculite in a range from about 1.5/1 to 0.15/1
   compressing the wet mix batch to form a compressed strip of material, and
   heating the compressed strip at a temperature of about 300° to 350° F. for about 10 to 15 hours to form a brake lining material.

8. A process as in claim 7 wherein the thermosetting liquid resin is selected from the group consisting of phenol formaldehyde, phenol furfural, melamine formaldehyde, epoxy resins, cross linked alkyd resins, diallyl phthalate resins, urea formaldehyde, cashew nut liquid resins, china wood oil, heat bodied linseed oil, latices, and elastomeric resins, said vermiculite and thermosetting liquid resin being present in the roll lining brake material in a weight ratio of resin to vermiculite, said weight ratio in a range having an upper limit not to exceed about 1.2/1 to 1.5/1 and having a lower limit not less than about 0.15/1.

9. A process as in claim 7 wherein the thermosetting liquid resin is a heat bodied linseed oil and the weight ratio of heat bodied linseed oil to expanded vermiculite is about 0.4/1.

10. A process as in claim 7 including the step of coiling the compressed strip of material into a roll prior to the step of heating the compressed strip.

* * * * *